United States Patent
Mills

(10) Patent No.: US 12,277,494 B2
(45) Date of Patent: Apr. 15, 2025

(54) MULTI-DIMENSIONAL TENSOR SUPPORT EXTENSION IN NEURAL NETWORK PROCESSOR

(71) Applicant: Apple Inc., Cupertino, CA (US)

(72) Inventor: Christopher L. Mills, Saratoga, CA (US)

(73) Assignee: APPLE INC., Cupertino, CA (US)

(*) Notice: Subject to any disclaimer, the term of this patent is extended or adjusted under 35 U.S.C. 154(b) by 787 days.

(21) Appl. No.: 16/953,033

(22) Filed: Nov. 19, 2020

(65) Prior Publication Data

US 2022/0156575 A1   May 19, 2022

(51) Int. Cl.
- *G06N 3/08* (2023.01)
- *G06N 3/045* (2023.01)
- *G06N 3/063* (2023.01)

(52) U.S. Cl.
CPC .............. *G06N 3/08* (2013.01); *G06N 3/045* (2023.01); *G06N 3/063* (2013.01)

(58) Field of Classification Search
None
See application file for complete search history.

(56) References Cited

U.S. PATENT DOCUMENTS

| | | | | |
|---|---|---|---|---|
| 11,640,526 | B2* | 5/2023 | Guo | G06N 3/04 706/25 |
| 2006/0229856 | A1 | 10/2006 | Burrus et al. | |
| 2019/0042923 | A1 | 2/2019 | Janedula et al. | |
| 2019/0205736 | A1 | 7/2019 | Bleiweiss et al. | |
| 2019/0332925 | A1* | 10/2019 | Modha | G06N 3/045 |
| 2019/0392287 | A1 | 12/2019 | Ovsiannikov et al. | |
| 2020/0117981 | A1* | 4/2020 | Arthur | G06N 3/063 |
| 2020/0160226 | A1 | 5/2020 | Ross et al. | |
| 2020/0184320 | A1 | 6/2020 | Croxford et al. | |
| 2020/0234099 | A1 | 7/2020 | Wang et al. | |
| 2020/0294182 | A1 | 9/2020 | George et al. | |
| 2021/0064987 | A1* | 3/2021 | Springer | G06F 17/153 |

(Continued)

OTHER PUBLICATIONS

"Confused about Tensors, Dimensions, Ranks, Orders, Matrices, and Vectors," Romeo Kinzler, Medium, Nov. 27, 2019 (Year: 2019).*

(Continued)

*Primary Examiner* — Michael J Huntley
*Assistant Examiner* — Paul J Breene
(74) *Attorney, Agent, or Firm* — Sterne, Kessler, Goldstein & Fox P.L.L.C.

(57) ABSTRACT

Embodiments of the present disclosure relate to a tensor access operation circuit in a neural processor circuit. The neural processor circuit further includes a data processor circuit and at least one neural engine circuit. The tensor access operation circuit indirectly accesses at least a region of a source tensor in a system memory having a rank, and maps one or more source components of the source tensor into an input tensor having another rank. The data processor circuit stores an output version of the input tensor obtained from the tensor access operation circuit and sends the output version of the input tensor as multiple of units of input data to the at least one neural engine circuit. The at least one neural engine circuit performs at least convolution operations on the units of input data and at least one kernel to generate output data.

20 Claims, 9 Drawing Sheets

(56) References Cited

U.S. PATENT DOCUMENTS

2021/0303359 A1    9/2021  Park et al.
2022/0129744 A1*   4/2022  Bondarenko .......... G06N 3/045

OTHER PUBLICATIONS

"Why High Dimensional Data Can Be So Troublesome," Tony Yiu, Medium, Jul. 20, 2019 (Year: 2019).*
"Tensor Contraction," Wikipedia, Mar. 28, 2003 (Year: 2003).*
"Introduction to Cloud TPU," Google Cloud (Year: 2020).*

* cited by examiner

MULTI-DIMENSIONAL TENSOR SUPPORT EXTENSION IN NEURAL NETWORK PROCESSOR

BACKGROUND

1. Field of the Disclosure

The present disclosure relates to a circuit for performing operations related to neural networks, and more specifically to multi-dimensional tensor support extension in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to a tensor access operation circuit in a neural processor circuit. The tensor access operation circuit is coupled to a system memory external to the neural processor circuit. The tensor access operation circuit indirectly accesses at least a region of a source tensor in the system memory having a rank, and maps one or more source components of at least the region of the source tensor into an input tensor having another rank. The neural processor circuit further includes a data processor circuit coupled to the tensor access operation circuit and at least one neural engine circuit coupled to the data processor circuit. The data processor circuit stores an output version of the input tensor. The at least one neural engine circuit receives, from the data processor circuit, the output version of the input tensor as multiple units of input data The at least one neural engine circuit performs at least one convolution operation on the units of input data to generate output data.

Figure 1:
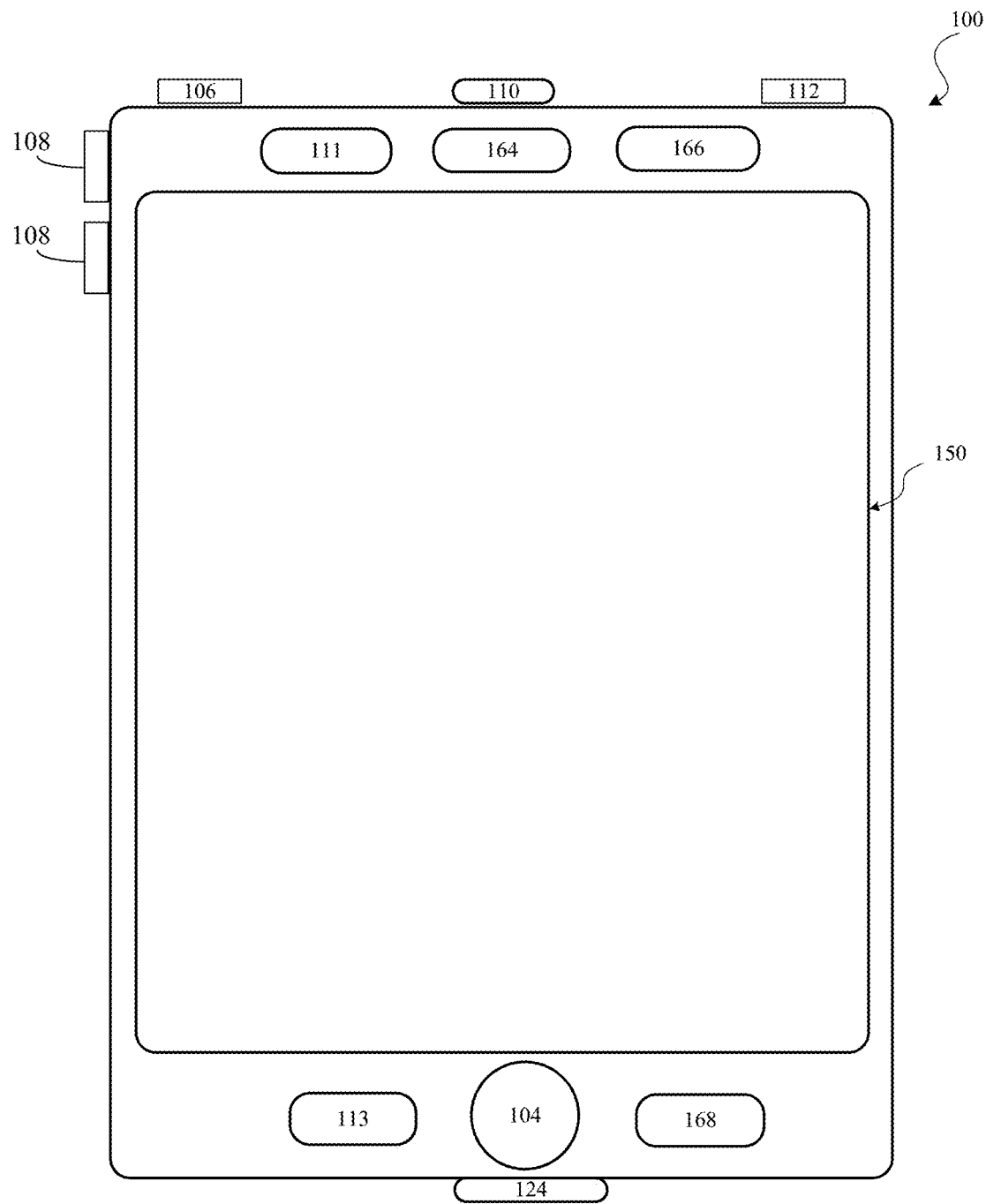
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a tensor access operation circuit with multi-dimensional tensor support extension in a neural processor circuit. The tensor access operation circuit is interfaced between a system memory external to the neural processor circuit and a data processor circuit of the neural processor circuit. The tensor access operation circuit applies a level of indirection on an input surface read from the system memory, thus providing desired flexibility in higher-level (e.g., five-dimensional) texture transforms of source data when fetching the source data from the system memory for usage by a neural engine circuit of the neural processor circuit (e.g., for convolution operations). The tensor access operation circuit indirectly accesses at least a region of a source tensor in the system memory, and maps one or more source components of at least the region of the source tensor having a rank (e.g., larger than one) into an input tensor having another rank (e.g., equal to or larger than zero). The data processor circuit stores an output version of the input tensor. The neural engine circuit receives, from the data processor circuit, the output version of the input tensor as multiple units of input data. The neural engine circuit performs at least one convolution operation on the units of input data to generate output data.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions.

Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
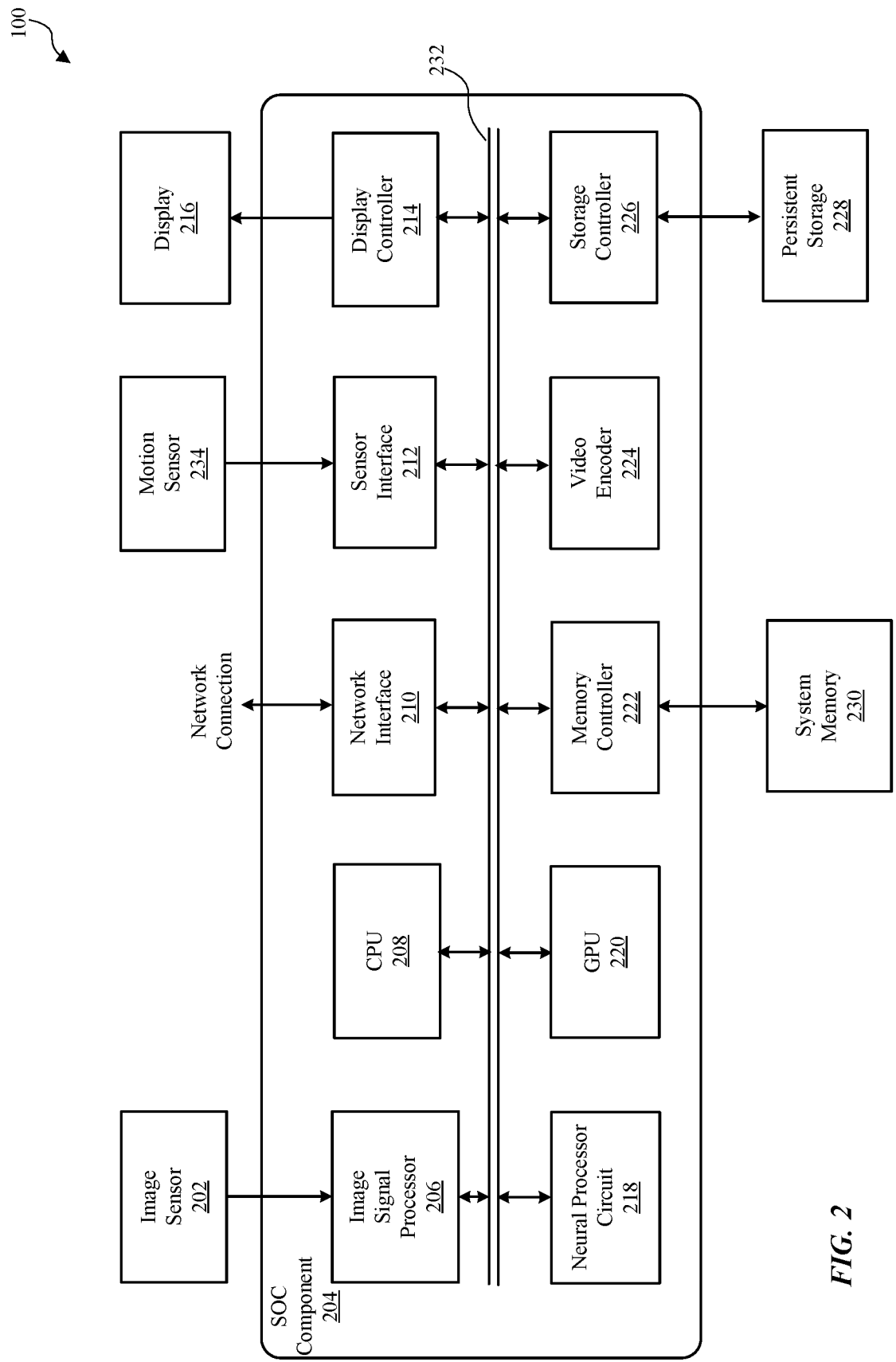
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor, a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional neural networks (CNNs), recurrent neural networks (RNNs), autoencoders, and long short term memory (LSTM). A machine learning model may be an independent model that works with neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, neural processor circuit 218 may also be used for the operations of other types of machine learning models, such as a kernel SVM.

Figure 3:
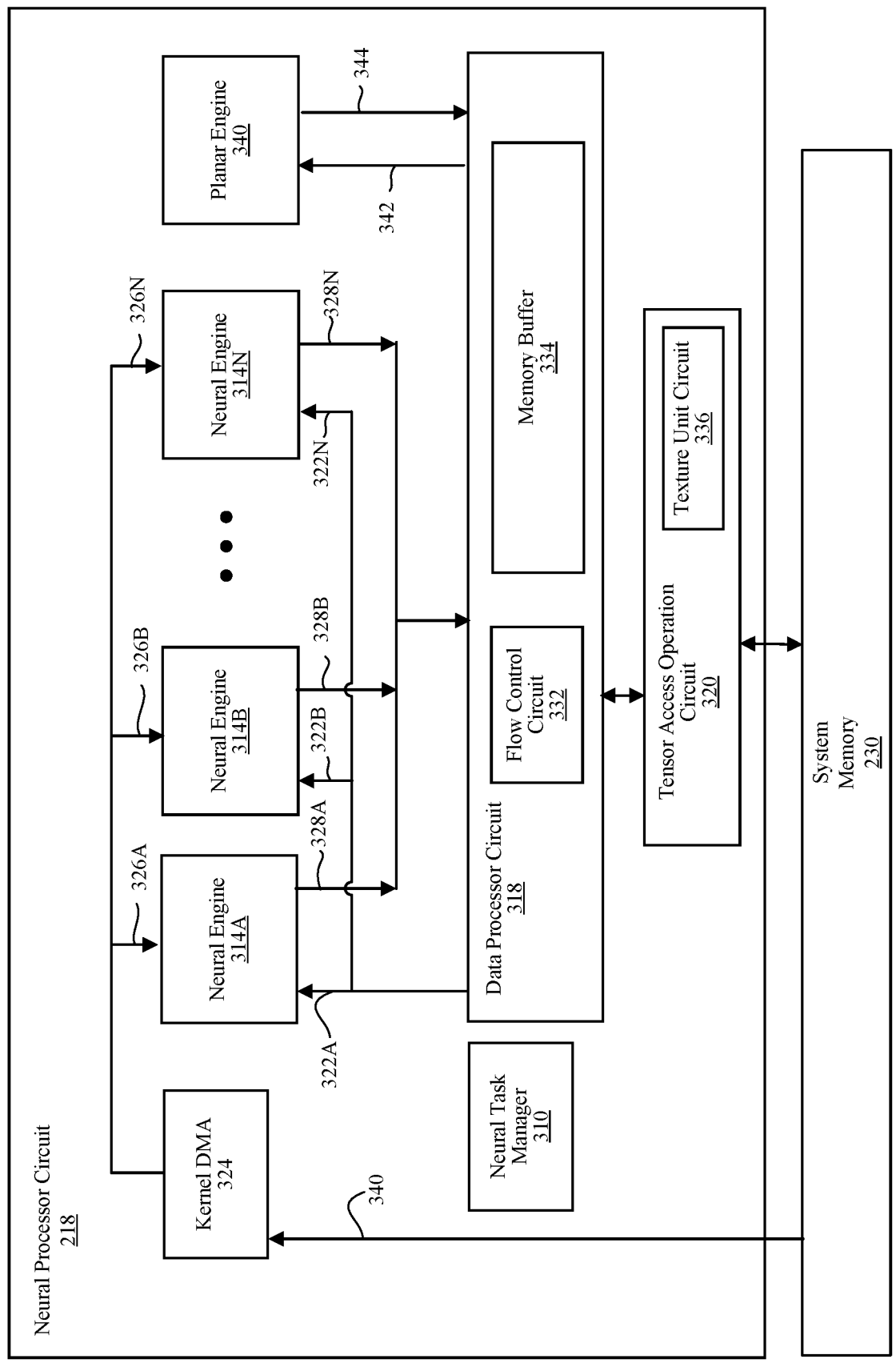
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, tensor access operation circuit 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of neural processor circuit 218 for performing the chosen task. Data may be associated with a task command that indicates the types of operations to be performed on the data. Data of neural processor circuit 218 includes input data that is transmitted from another source such as system memory 230, and data generated by neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by neural processor circuit 218. Although neural task manager 310 is illustrated in FIG. 3 as part of neural processor circuit 218, neural task manager 310 may be a component outside neural processor circuit 218.

Kernel DMA 324 is a read circuit that fetches kernel data from a source (e.g., system memory 230) and sends kernel data 326A through 326N to each of neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer memory 334 may be part of, among others, image data, histogram of oriented gradients (HOG) data, audio data, metadata, output data 328 of a previous cycle of a neural engine 314, and other processed data received from other components of the SOC component 204.

Tensor access operation circuit 320 includes a read circuit that receives a segment (e.g., a tensor) of the input data from a source (e.g., system memory 230) for storing in buffer memory 334, and a write circuit that forwards data from buffer memory 334 to a target component (e.g., system memory 230). In one embodiment, the direct memory access nature of tensor access operation circuit 320 may allow tensor access operation circuit 320 to fetch and write data directly from a source (e.g., system memory 230) without the involvement of CPU 208. Buffer memory 334 may be a direct memory access buffer that stores data of a machine learning model of device 100 without involvement of CPU 208. Tensor access operation circuit 320 includes a texture unit circuit 336 for fetching the segment (e.g., tensor) of the input data (e.g., gathering or cropping) from system memory 230 and for providing texture processing before sending the tensor to buffer memory 334. Texture unit circuit 336 provides multi-dimensional tensor support extension in neural processor circuit 218. The structure and operations of tensor access operation circuit 320 and texture unit circuit 336 will be discussed in further detail below with reference to FIGS. 6-9.

Example Neural Engine Architecture

Figure 4:
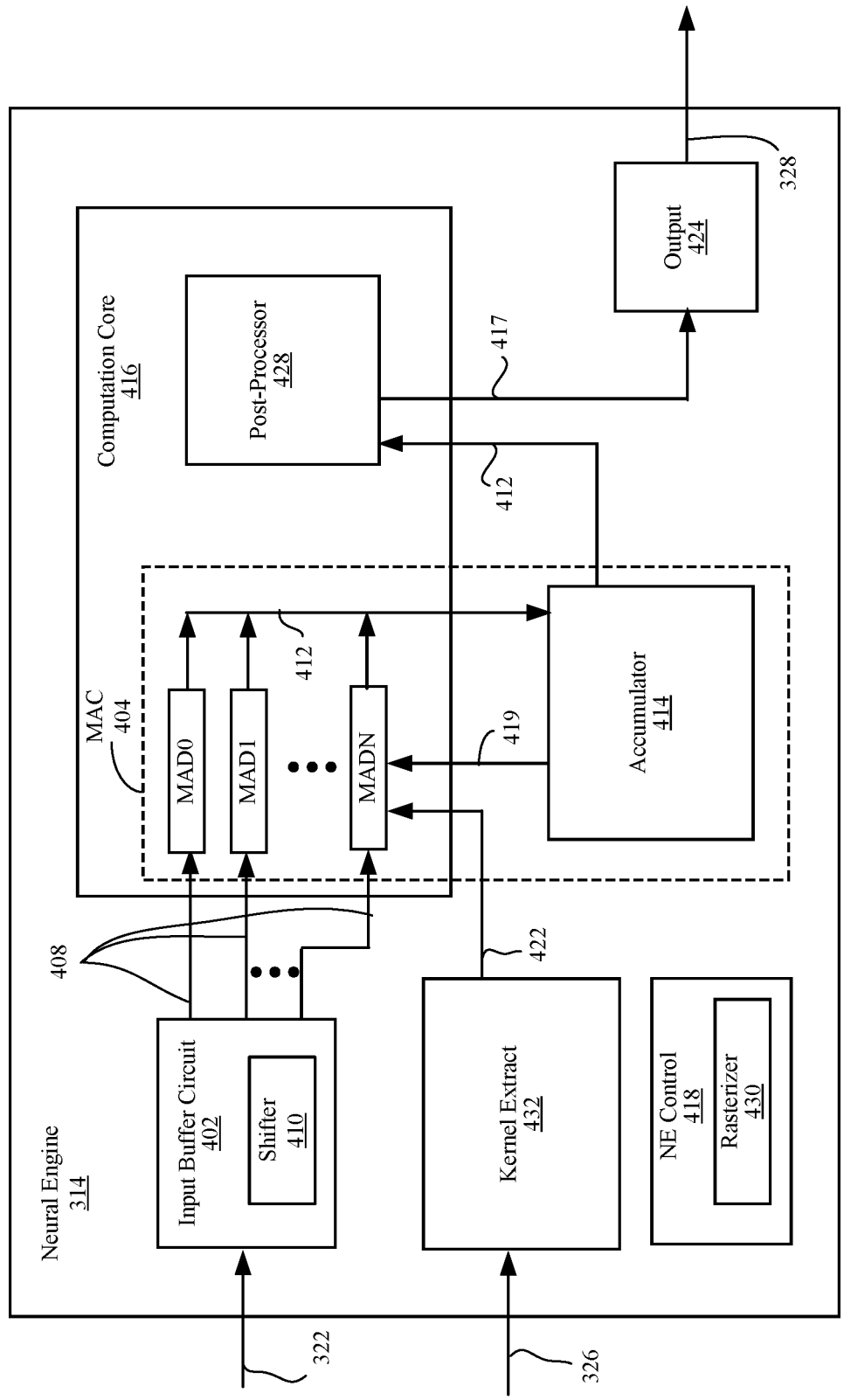
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations that may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that receives and stores processed values 412 from MAD circuits. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator circuit 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator circuit 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to buffer memory 334. Other components of neural processor circuit 218 (e.g., kernel DMA 324, tensor access operation circuit 320, buffer memory 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
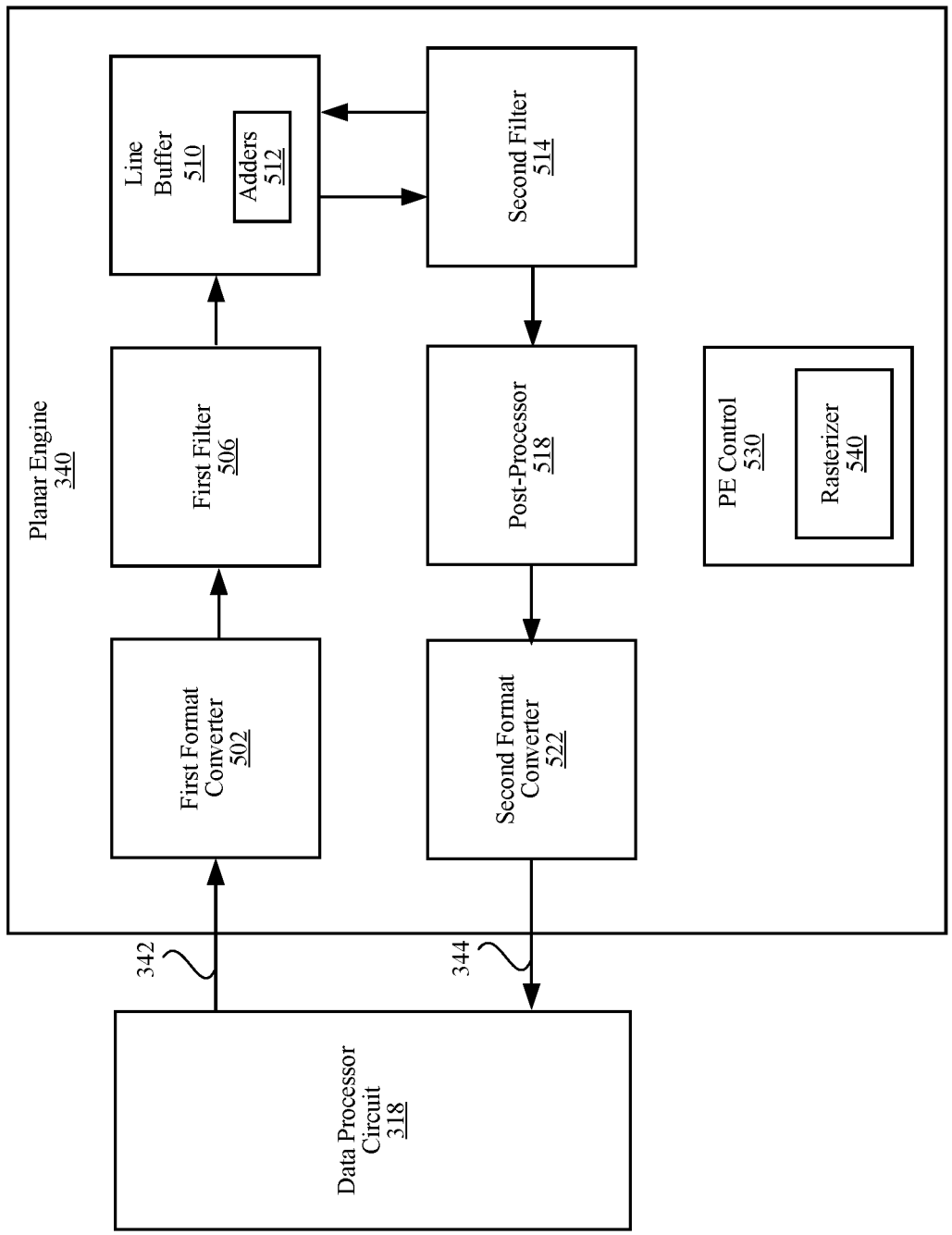
FIG. 5 is a block diagram of a planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer memory 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Access Operation Circuit in Neural Processor Circuit

Figure 6:
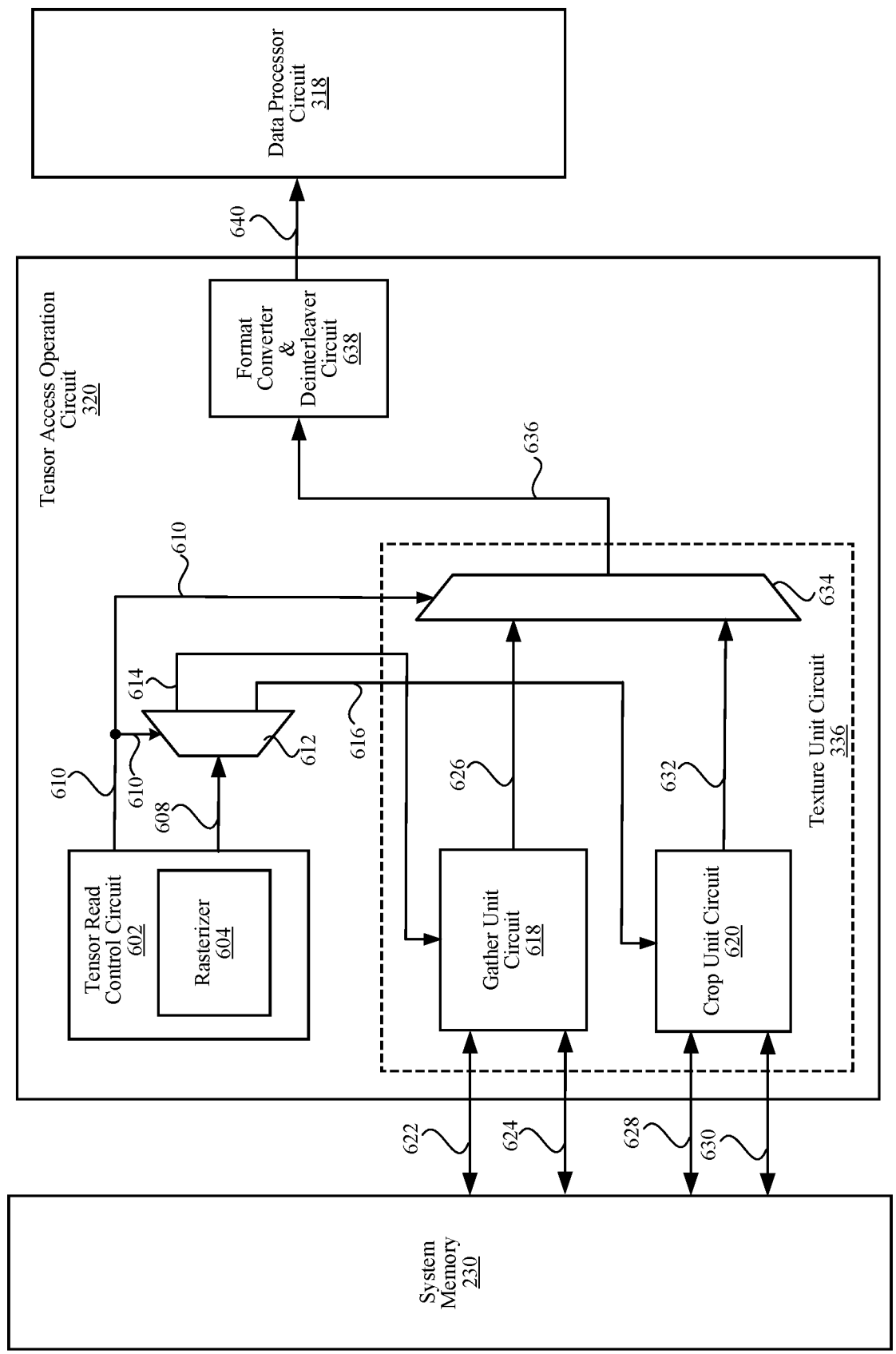
FIG. 6 is a block diagram of a tensor access operation circuit for fetching source components from system memory using indirection, according to one embodiment.

FIG. 6 is a block diagram of tensor access operation circuit 320 for fetching source data (e.g., source tensor) from system memory 230 using indirection, according to one embodiment. Tensor access operation circuit 320 is coupled between system memory 230 and data processor circuit 318, and stores source data fetched from system memory 230 into data processor circuit 318 (e.g., into memory buffer 334) for usage by at least one neural engine 314 (e.g., for convolutions). Tensor access operation circuit 320 indirectly accesses at least a region of a source tensor in system memory 230 having one or more source components (e.g., dimensions). The one or more source components may be structured in system memory 230 to have a defined rank (e.g., number of mutually independent dimensions). Tensor access operation circuit 320 maps the one or more source components from the defined rank (e.g., larger than three) into an input tensor having a another rank (e.g., equal to or greater than zero). Tensor access operation circuit 320 includes tensor read control circuit 602, format converter and deinterleaver circuit 638, and texture unit circuit 336 with a gather unit circuit 618 and a crop unit circuit 620. Tensor access operation circuit 320 may include fewer or additional components not illustrated in FIG. 6.

Tensor read control circuit 602 includes a rasterizer 604 that generates source index 608 for indirect referencing of the one or more source components in system memory 230. Source index 608 is an index over an input back-projection of a source surface allocated in system memory 230. In some embodiments, source index 608 is a five-dimensional tuple with index components representing, e.g., width, height, channel, depth, and group of the source surface. Each index component of source index 608 represents a particular location of a source component in an input activation layer of convolution (referred herein as an output version of input tensor 640) stored in data processor circuit 318 after being fetched from system memory 230 and processed by components of tensor access operation circuit 320. Source index 608 generated by rasterizer 604 is passed onto texture unit circuit 336, either as a source index 614 passed into gather unit circuit 618 or as a source index 616 passed onto crop unit circuit 620 based on a mode signal 610 generated by, e.g., tensor read control circuit 602 that selects an appropriate output of a demultiplexer 612. may perform some additional operations, e.g., three-dimensional (3D) sequencing of one or more surfaces in system memory 230.

Texture unit circuit 336 fetches the one or more source components from system memory 230 using indirection. Texture unit circuit 336 can operate in one of two mutually exclusive modes, e.g., in a gather mode or in a crop mode. In the gather mode, source index 608 generated by rasterizer 604 is passed onto gather unit circuit 618 as source index 614 via demultiplexer 612 based on a corresponding value of mode signal 610. Gather unit circuit 618 addresses, based in part on source index 614, an index tensor allocated in system memory 230 representing indexing information into source tensor 624. The index tensor may be a six-dimensional tensor addressed using six-dimensional indexes that decompose, e.g., a channel dimension into plane and interleave dimensions. Components of the index tensor may correspond to, e.g., group, depth, plane, height, width, interleave. Gather unit circuit 618 gathers a source tensor 624 from system memory 230 by referencing the one or more source components of source tensor 624 based in part on an interleave-sized vector of components 622 fetched from the index tensor allocated in system memory 230, and maps the one or more source components of source tensor 624 into an input tensor 626. Crop unit circuit 620 may be turned off while texture unit circuit 336 operates in the gather mode, e.g., to save power. The structure and operations of components of gather unit circuit 618 will be discussed in further detail below with reference to FIG. 7.

In the crop mode, source index 608 generated by rasterizer 604 is passed onto crop unit circuit 620 as source index 616 via demultiplexer 612 based on a corresponding value of mode signal 610. Crop unit circuit 620 addresses, based in part on source index 616, an index tensor allocated in system memory 230. Crop unit circuit 620 further generates, based in part on components of the index tensor, crop descriptors 628 for accessing and extracting a region of a source tensor 630 in system memory 230 to obtain an input tensor 632. Gather unit circuit 618 may be turned off while texture unit circuit 336 operates in the crop mode, e.g., to save power. The structure and operations of components of crop unit circuit 620 will be discussed in further detail below with reference to FIG. 8.

Figure 7:
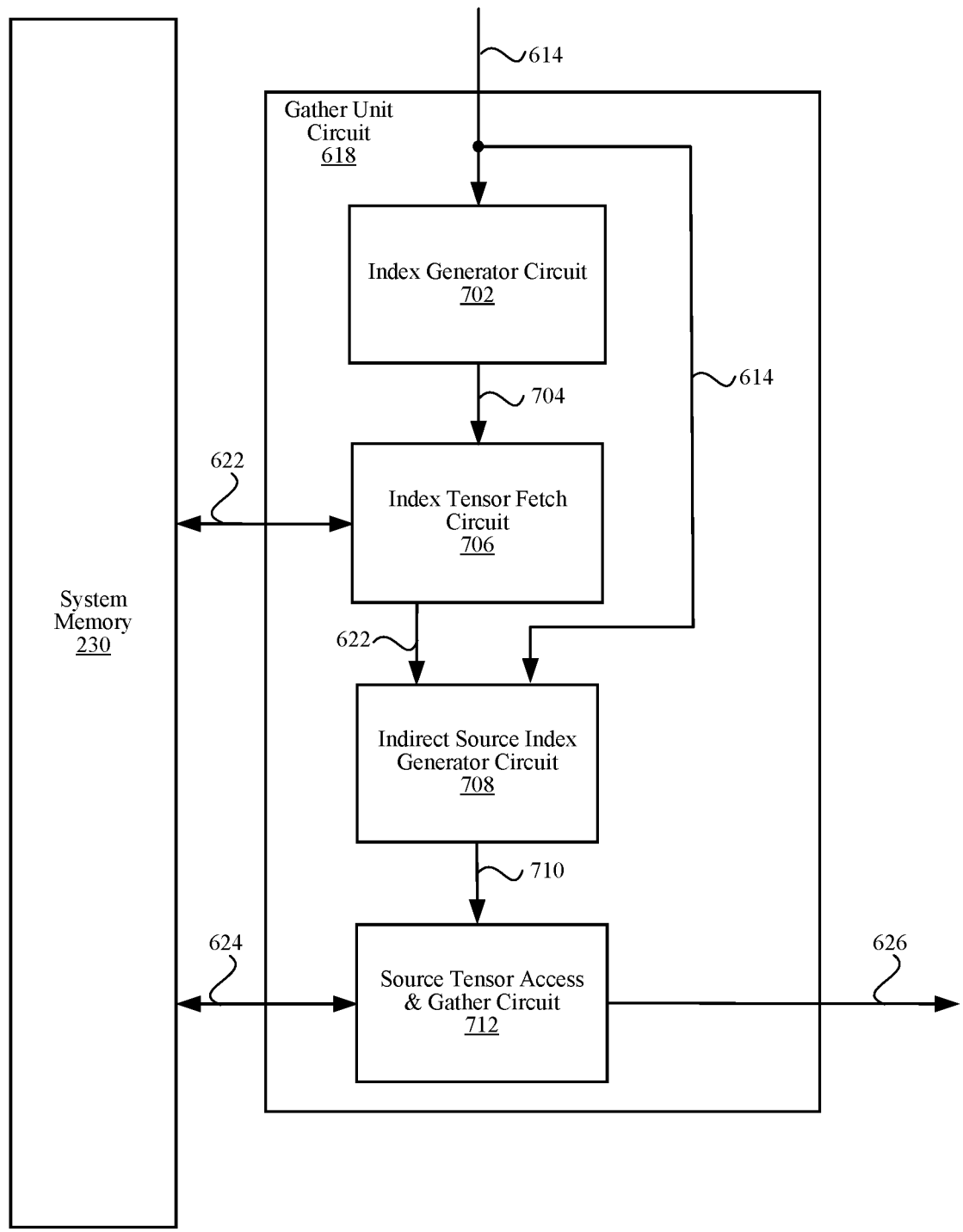
FIG. 7 is a block diagram of a gather unit circuit of the tensor access operation circuit, according to one embodiment.

FIG. 7 is a block diagram of gather unit circuit 618, according to one embodiment. Gather unit circuit 618 includes an index generator circuit 702, an index tensor fetch circuit 706, an indirect source index generator circuit 708, and a source tensor access and gather circuit 712. Gather unit circuit 618 may include fewer or additional components not illustrated in FIG. 7. Gather unit circuit 618 receives source index 614 (e.g., from tensor read control circuit 602) that is passed onto index generator circuit 702. Source index 614 received by gather unit circuit 618 may be, e.g., a five-dimensional tuple.

Index generator circuit 702 computes, using source index 614, an index 704 for referencing the index tensor in system memory 230. Index 704 may be also, e.g., a five-dimensional tuple. Index generator circuit 702 may permute (e.g., transpose) at least some dimensions of source index 614 to generate components of index 704 for referencing the index tensor in system memory 230. Index generator circuit 702 may also perform rank reduction when permuting (e.g., transposing) at least some dimensions of source index 614 to generate index 704 with a reduced rank for referencing the index tensor in system memory 230. Index 704 generated by index generator circuit 702 is passed onto index tensor fetch circuit 706.

Index tensor fetch circuit 706 is directly coupled to system memory 230. Index tensor fetch circuit 706 fetches vector of components 622 from system memory 230 by referencing components of the index tensor in system memory 230 using components of index 704. At least some subset of components of index 704 generated by performing permutation and/or rank reduction on at least some dimensions of source index 614 (e.g., five-dimensional tuple) is used to address the index tensor allocated in system memory 230. The result of this dereferencing is the fetched vector of components 622 whose length is a function of the interleave component of the index tensor in system memory 230. Hence, a rank of the index tensor may be larger than a rank of source index 614 and a rank of index 704, e.g., the index tensor is a six-dimensional tensor in the case of five-dimensional source index 614. The extra rank of index tensor can have an extent between one and five (e.g., based on the interleave component). The components of vector 622 fetched from system memory 230 are passed onto indirect source index generator circuit 708. In addition, source index 614 received by gather unit circuit 618, e.g., from tensor read control circuit 602, is also passed onto indirect source index generator circuit 708.

Indirect source index generator circuit 708 generates, using the components of fetched vector 622 and source index 614, an indirect source index 710 for indirect addressing of source tensor 624 allocated in system memory 230. Indirect source index 710 generated in this manner may be, e.g., a five-dimensional tuple. Indirect source index generator circuit 708 may permute dimensions of source index 614 to obtain a processed version of source index 614. Indirect source index generator circuit 708 may also permute dimensions (components) of fetched vector 622 and de-normalize the permuted dimensions of fetched vector 622 to generate an indirect index. Indirect source index generator circuit 708 may then compute indirect source index 710 using the indirect index and the processed version of source index 614 (e.g., by adding corresponding components of the indirect index and the processed version of source index 614). Indirect source index 710 computed by indirect source index generator circuit 708 is passed onto source tensor access and gather circuit 712.

Source tensor access and gather circuit 712 may be directly coupled to system memory 230. Source tensor access and gather circuit 712 fetches source tensor 624 from system memory 230 by accessing source components of source tensor 624 in system memory 230 using components of indirect source index 710, and maps the source components of source tensor 624 into input tensor 626. A rank of input tensor 626 may be different (e.g., smaller) than a rank of source tensor 624. Source tensor access and gather circuit 712 may permute at least some dimensions (e.g., source components) of source tensor 624 using indirect source index 710 to generate input tensor 626. Source tensor access and gather circuit 712 may include a filtering unit circuit (not shown in FIG. 7) for processing (e.g., filtering) of one or more source components of source tensor 624 by performing e.g., bilinear interpolation, interleaving, boundary padding, reshaping, three-dimensional filtering, nearest neighbor interpolation, some other processing, or combination thereof.

When generating the indirect index, indirect source index generator circuit 708 may pad zeroes to fetched vector 622 (e.g., to make fetched vector 622 a five-dimensional tuple). After that, indirect source index generator circuit 708 may transpose at least some components of fetched vector 622 with the padded zeroes so that the indirect index (e.g., the five-dimensional tuple) is obtained whose components can be treated as offsets to be applied onto arbitrary dimensions. Indirect source index generator circuit 708 may similarly process source index 614 (e.g., by applying zero padding and transposition) to generate the processed version of source index 614 (e.g., the five-dimensional tuple). Indirect source index generator circuit 708 may combine (e.g., add) the two resulting tuples (e.g., the indirect index and the processed version of source index 614) to produce indirect source index 710 (e.g., a five-dimensional tuple) used to fetch one or more source components of source tensor 624. Each dimension of fetched source tensor 624 may have a component originating from source index 614 and/or a component of vector 622 fetched from the index tensor. Thus, the corresponding dimension of fetched source tensor 624 may be indirectly referenced (e.g., if originating only from the index tensor), passed-through or transposed (e.g., if originating only from source index 614), treated as an offset (if originating from both the index tensor and source index 614) or deleted (if corresponding components of both the index tensor and source index 614 are zero) causing a broadcast in the corresponding dimension. Various combinations for each dimension of fetched source tensor 624 allows for a variety of possible interpretations of texturing operation of texture unit circuit 336 when generating input tensor 636 for storage into data processor circuit 318.

Figure 8:
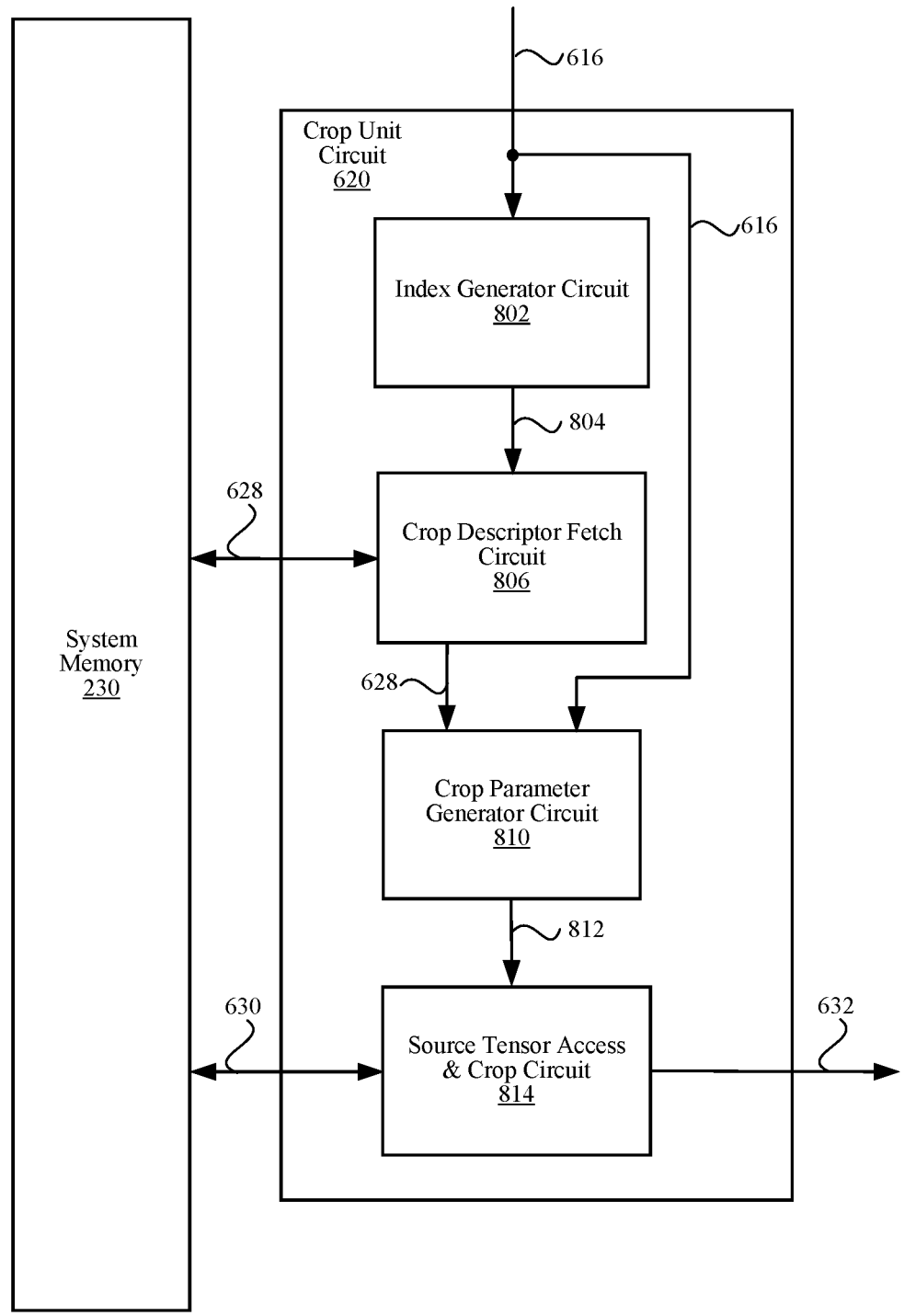
FIG. 8 is a block diagram of a crop unit circuit of the tensor access operation circuit, according to one embodiment.

FIG. 8 is a block diagram of crop unit circuit 620, according to one embodiment. Crop unit circuit 620 includes an index generator circuit 802, a crop descriptor fetch circuit 806, a crop parameter generator circuit 810, and a source tensor access and crop circuit 814. Crop unit circuit 620 may include fewer or additional components not illustrated in FIG. 8. Crop unit circuit 620 receives source index 616 (e.g., from tensor read control circuit 602) that is passed onto index generator circuit 802.

Index generator circuit 802 computes, using source index 616, an index 804 for referencing an index tensor in system memory 230. Index 804 may be e.g., a five-dimensional tuple. Index 804 is passed onto crop descriptor fetch circuit 806.

Crop descriptor fetch circuit 806 is directly coupled to system memory 230. Crop descriptor fetch circuit 806 addresses the index tensor in system memory 230 using index 804, and fetches crop descriptors 628 (e.g., crop vectors) representing components of the addressed index tensor. The fetches crop descriptors 628 can be later used for indexing a region of source tensor 630 to be extracted (e.g., cropped) from system memory 230. Crop descriptors 628 represent high-level descriptions used for computation of an indirect source index for resampling (e.g., cropping) of a source tensor. Crop descriptor fetch circuit 806 passes crop descriptors 628 onto crop parameter generator circuit 810. Crop parameter generator circuit 810 also receives source index 616 generated by, e.g., tensor read control circuit 602.

There is one crop descriptor 628 (e.g., crop vector) per group. An extent (e.g., a rank) of each crop descriptor 628 can be, e.g., 1, 2, 3, 4, or 8, which represents a configurable interleave factor. In some embodiments, all eight values of crop descriptor 628 can be used. For example, six values of crop descriptor 628 can specify an affine transform (e.g., an arbitrary 3×2 affine transform), and the remaining two values of crop descriptor 628 can be used as batching indexes to select a source group and a source depth. In the crop mode, the index tensor allocated in system memory 230 is a two-dimensional tuple, e.g., Group x Interleave. Crop descriptor 628 describes (e.g., in a user-defined manner) parameters for extracting an affine crop from the source tensor allocated in system memory 230. The content of crop descriptor 628 can be used to define plane equations for the affine transform and possibly also batch indexes to select which tensor from a batch of tensors to extract from system memory 230. Since the parameters can be configurable, a layout and interpretation of elements of crop descriptor 628 can be also configurable. For example, the layout and interpretation of elements of crop descriptor 628 can be any of the following: {Left, Right, Top, Bottom}; {Top, Left, Bottom, Right}; {BatchIndex, XCenter, YCenter, Width, Height}; {Top, Left, BatchIndex}; {M11, M12, M13, M21, M22, M23}, where M is a general 3×2 affine matrix; {M11, M12, M13, M21, M22, M23, GroupIndex, DepthIndex}, etc.

Crop parameter generator circuit 810 computes, using crop descriptors 628 and source index 616, components (dimensions) of an indirect source index for referencing the region of source tensor 630 in system memory 230. The indirect source index may be a five-dimensional tuple having the components (dimensions) related to, e.g., channel, height, width, group and depth dimensions. The channel dimension is a pass-through dimension, and no indirection is performed on the channel dimension when referencing the region of source tensor 630 in system memory 230. In such case, channel dimension of the indirect source index is equal to a channel dimension of source index 616, e.g., texturing by crop unit circuit 620 does not change a size of original source. The height and width dimensions utilize the plane equations. Crop parameter generator circuit 810 uses at least some values of crop vector 628 to produce an affine transform for generating corresponding dimensions (components) of the indirect source index. Thus, the height and width dimensions of the indirect source index are obtained by performing the affine transform (e.g., using a 3×2 affine matrix) on height and width dimensions of source index 616. The group and depth dimensions are batching dimensions. In some embodiments, the group and depth dimensions can be set to be passthrough, e.g., a group dimension of the indirect source index is equal to a group dimension of source index 616, which means that each crop descriptor 628 is specific to its own source tensor in system memory 230. In some other embodiments, the group and depth dimensions can be set to be broadcast dimensions, e.g., the group dimension of the indirect source index is zero, which means that all crop descriptors 628 reference the same source tensor in system memory 230. Alternatively, the group and depth dimensions may be taken from the corresponding crop descriptors 628, thus allowing each crop descriptor 628 to select its source tensor in system memory 230 from a batch.

The components (dimensions) of the indirect source index represent crop parameters 812 for extracting (cropping) the region of source tensor 630 in system memory 230. In some embodiments, in a static crop mode, crop parameter generator circuit 810 obtains crop parameters 812 directly from source index 616 based on information from a task descriptor (e.g., rasterizer 604). Since crop parameters 812 are directly obtained from source index 616, index generator circuit 802 and crop descriptor fetch circuit 806 are bypassed and may be turned off in the static crop mode. Crop parameters 812 obtained by crop parameter generator circuit 810 are passed onto source tensor access and crop circuit 814.

Source tensor access and crop circuit 814 may be directly coupled to system memory 230. Source tensor access and crop circuit 814 references the region of source tensor 630 in system memory 230 using the crop parameters of indirect source index 812, and extracts (crops) the region of source tensor 630 from system memory 230 to generate input tensor 632. Source tensor access and crop circuit 814 may include a filtering unit circuit (not shown in FIG. 8) for processing (e.g., filtering) components of extracted region of source tensor 630 by performing e.g., bilinear interpolation, interleaving, boundary padding, reshaping, three-dimensional filtering, nearest neighbor interpolation, some other processing, or combination thereof.

In some embodiments, one or more circuits illustrated in FIG. 7 and FIG. 8 can be shared between gather unit circuit 618 and crop unit circuit 620. For example, index generator circuit 702 and index generator circuit 802 may be implemented as a single index generator circuit shared between gather unit circuit 618 and crop unit circuit 620. Also, index tensor fetch circuit 706 and crop descriptor fetch circuit 806 may be implemented as a single fetch circuit shared between gather unit circuit 618 and crop unit circuit 620. Furthermore, the filter unit circuit of source tensor access and gather circuit 712 and the filter unit circuit of source tensor access and crop circuit 814 may perform the same filtering operations and can be implemented as a single filter unit circuit, e.g., outside of source tensor access and gather circuit 712 and source tensor access and crop circuit 814.

Values of certain coordinates of indirect indices used in the gather mode (e.g., values of components of fetched vector 622) and the crop mode (e.g., values of components of the indirect source index) can be de-normalized, e.g., by indirect source index generator circuit 708 in the gather mode and by crop parameter generator circuit 810 in the crop mode. In some embodiments (e.g., for a first normalized mapping), the coordinates may be non-normalized so that values in the range of [0 Size-1] map directly to values along an edge of a corresponding component (e.g., of extent Size). In some other embodiments (e.g., for a second normalized mapping), the coordinates may be normalized so that values in the range of [0.0 1.0] map to [0 Size-1]. In the case of the second normalized mapping, the normalized values may be mapped such that the value of 0.0 maps to a center of a component referenced with an "index 0" (e.g., of the indirect source index) and the value of 1.0 maps to a center of another component referenced with "an index Size-1". In the case of the first non-normalized mapping, the normalized values may be mapped such that the value of 0.0 maps to an edge of the component referenced with the "index 0", and the value of 1.0 maps to the other component referenced with "the index Size-1". In some embodiments, the normalized coordinates can be reflected at their edges by enabling wrapping, which wraps the normalized coordinates to, e.g., the range of [0.0-2.0) by discarding high-order bits from the fixed-point representation. After wrapping, values 1.0 or larger may be reflected back by subtracting them from 2.0. The two aforementioned normalized mappings may produce two different reflections. The first normalized mapping replicates an edge sample, e.g., the edge sample 'ABC' is mapped into 'ABCCBAABC', whereas the second normalized mapping does not replicate an edge sample, e.g., the edge sample 'ABC' is mapped into 'ABCBABC'.

Normalized coordinates may be denormalized by multiplying their values by Size or Size-1 as appropriate to their mapping, e.g., with ½ subtracted in the former case so that the range of [0.0 1.0] maps to [−½ Size-½]), e.g., to make them non-normalized. The resulting non-normalized coordinates may be clamped to a tensor extent in each dimension (e.g., [0.0 Size-1]). Out-of-bound coordinates may be clamped to a closest in-bound coordinate, or replaced with a configurable background value. The final indexing values (e.g., if not replaced with the background value) may be used to sample a source tensor allocated in system memory 230. In some embodiments, the sampling may be performed using the nearest-neighbor sampling, which rounds the non-normalized value to the nearest integral component index. In some other embodiments, the sampling may be performed using linear interpolation, which uses the fractional part of an index value to interpolate between the two closest samples.

Referring back to FIG. 6, in the gather mode, input tensor 626 generated by gather unit circuit 618 is passed via a multiplexer 634 controlled by mode signal 610 as an input tensor 636 onto format converter and deinterleaver circuit 638. Similarly, in the crop mode, input tensor 632 generated by crop unit circuit 620 is passed via multiplexer 634 controlled by mode signal 610 as input tensor 636 onto format converter and deinterleaver circuit 638. Format converter and deinterleaver circuit 638 performs format conversion and deinterleaving of input tensor 636 produced by texture unit circuit 336 (e.g., either by gather unit circuit 618 or by crop unit circuit 620) to generate an output version of input tensor 640 for storage (e.g., in a planar arrangement) into data processor circuit 318 (e.g., into buffer memory 334). In some embodiments, format converter and deinterleaver circuit 622 is bypassed, and input tensor 636 produced by texture unit circuit 336 represents output version of input tensor 640 stored into data processor circuit 318.

Source components fetched from system memory 230 in both gather mode and crop mode may include clipped values for storage into data processor circuit 318 as output version of input tensor 640. The clipped values correspond to valid components in the convolution source that did not map to a valid portion of a source tensor in system memory. This can happen when an index tensor points outside of a source tensor allocated in system memory 230 and backgrounding is enabled, e.g., by a task descriptor (rasterizer 604). This can also happen when computation of the index tensor produces a nonsensical (NaN) value for at least one component of the index tensor. The clipped values can be differentiated as either backgrounded values or clamped values. The backgrounded values are values corresponding to a "background" color. The filter unit circuit (e.g., within source tensor access and gather circuit 712 in the gather mode, and within source tensor access and crop circuit 814 in the crop mode) does not perform any filtering operations for the backgrounded values. Instead, the filter unit circuit may provide at last one configurable background value for replacing the backgrounded values. The filter unit circuit may wrap the backgrounded values in source tensor 624 when generating input tensor 626 in the gather mode, as well as in the region of source tensor 630 when generating input tensor 632 in the crop mode. The clamped values are values that are clamped to an edge of the gathered or cropped source components of a source tensor allocated in system memory 230. The clamping is applied, e.g., when the index tensor points outside of the source tensor and the backgrounding is not enabled. The filter unit circuit fetches components from system memory 230 that correspond to the clamped values. The filter unit circuit may further wrap the clamped values in source tensor 624 when generating input tensor 626 in the gather mode, as well as in the region of source tensor 630 when generating input tensor 632 in the crop mode.

In some embodiments, data processor circuit 318 sends output version of input tensor 640 as multiple units of input data 322 to at least one neural engine 314 that performs at least one convolution operation on the units of input data 322 and at least one kernel 326 to generate output data 328 for storage into, e.g., data processor circuit 318. Alternatively or additionally to convolution operations, at least one neural engine 314 may perform some other operations on output version of input tensor 640, e.g., pooling operations, transpose operations, copying operations, element-wise operations, activation functions, sinus based functions, exponential functions, floor operations, reduction operations, argmax operations, sorting operations, conversion operations, some other functions or operations, or combination thereof. Planar engine 340 may perform a planar operation on at least a portion of output data 328 received from data processor circuit 318 as input data 342 to generate output data 344, which may be written back into data processor circuit 318 (e.g., into buffer memory 334). In some other embodiments, data processor circuit 318 sends output version of input tensor 640 as multiple units of input data 342 directly to planar engine 340. Alternatively, both neural engine 314 and planar engine 340 may pass output version of input tensor 640 (e.g., as multiple units of input data 322 or input data 342) without any modification, e.g., when only texturing operation is required without additional convolution operation. Additionally or alternatively, one or more data-transfer functions can be applied on output version of input tensor 640 while transferring output version of input tensor 640 to at least one neural engine 314 or planar engine 340, e.g., format conversion, scaling function, transpose function, reshaping, some other data-transfer function or combination thereof. In some other embodiments, output version of input tensor 640 produced by tensor access operation circuit 320 is provided to one or more other circuits different than at least one neural engine 314 and planar engine 340, e.g., a reshape circuit, a kernel packer circuit, etc.

Example Process at Neural Engine Architecture

Figure 9:
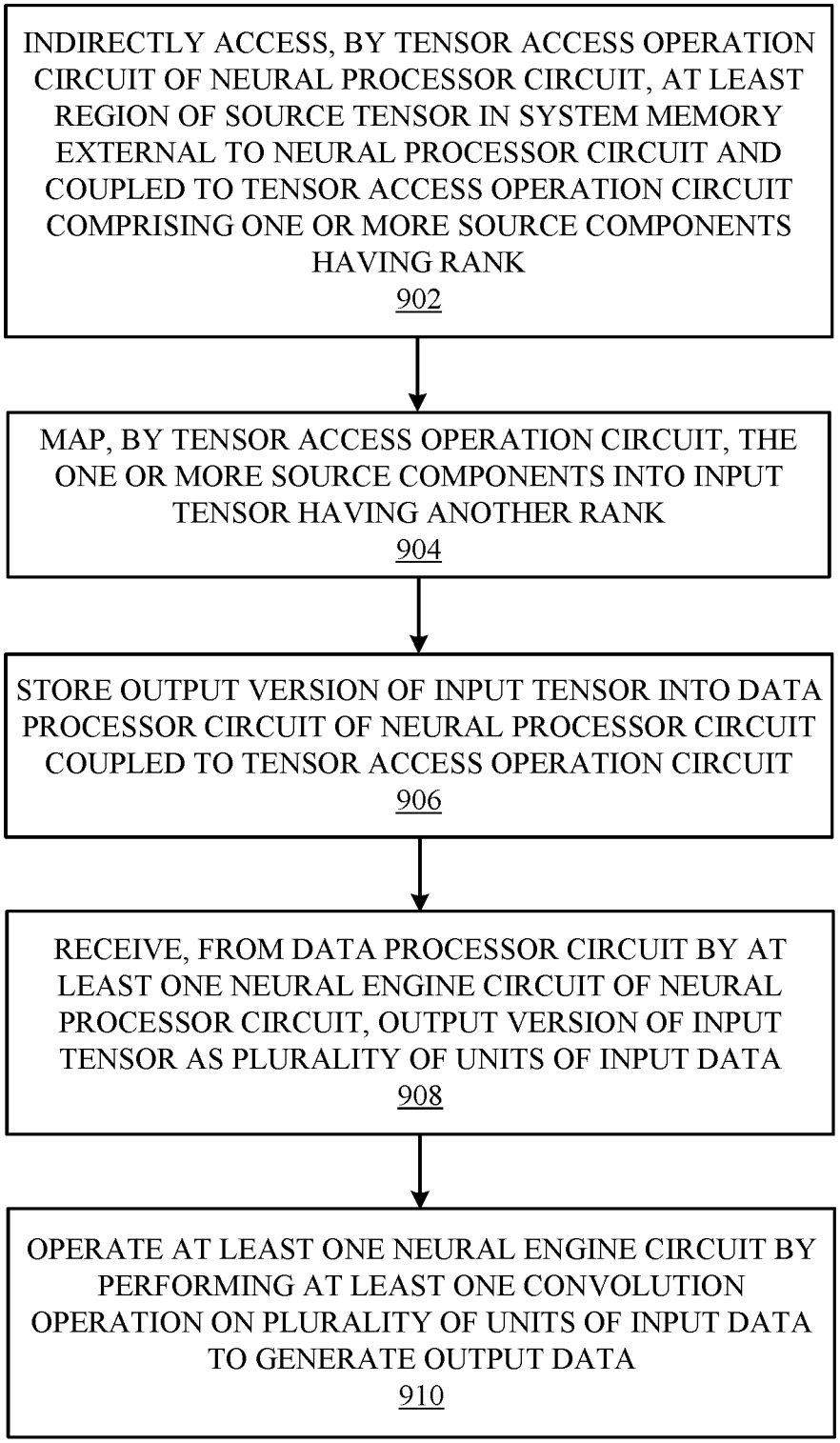
FIG. 9 is a flowchart illustrating a method of operating the neural processor circuit having the tensor access operation circuit, according to one embodiment.

FIG. 9 is a flowchart illustrating a method of operating a neural processor circuit (e.g., neural processor circuit 218) having a tensor access operation circuit (e.g., tensor access operation circuit 320), according to one embodiment. The neural processor circuit indirectly accesses 902 (e.g., by the tensor access operation circuit) at least a region of a source tensor in a system memory external to the neural processor circuit comprising one or more source components having a rank. The neural processor circuit maps 904 (e.g., by the tensor access operation circuit) the one or more source components into an input tensor having another rank (e.g., lower than the rank).

The neural processor circuit stores 906 an output version of the input tensor into a data processor circuit (e.g., data processor circuit 318) of the neural processor circuit coupled to the tensor access operation circuit. The neural processor circuit receives 908, from the data processor circuit by at least one neural engine circuit (e.g., at least one neural engine 314) of the neural processor circuit, the output version of the input tensor as multiple units of input data.

The neural processor circuit operates 910 the at least one neural engine circuit by performing at least one convolution operation on the units of input data to generate output data.

Embodiments of the process as described above with reference to FIG. 9 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
a tensor access operation circuit coupled to a system memory external to the neural processor circuit, the tensor access operation circuit configured to:
select, based on a mode signal, an operation mode to access the system memory in one of two mutually exclusive modes;
indirectly access, in response to the selected operation mode including a first mode of the two mutually exclusive modes, at least a region of a source tensor in the system memory based on a first index for referencing a first index tensor in the system memory generated by a first circuit using a source index provided to the first circuit in the first mode;
indirectly access, in response to the selected operation mode including a second mode of the two mutually exclusive modes, at least the region of the source tensor in the system memory based on crop descriptors generated by a second circuit and used for computation of an indirect source index, wherein the crop descriptors are generated by the second circuit receiving as input a second index for referencing a second index tensor, the second index is generated by a third circuit using the source index provided to the third circuit in the second mode, the source tensor comprising one or more source components having a rank; and
map the one or more source components into an input tensor having another rank;
a data processor circuit coupled to the tensor access operation circuit, the data processor circuit configured to store an output version of the input tensor; and
at least one neural engine circuit coupled to the data processor circuit, the at least one neural engine circuit configured to:
receive, from the data processor circuit, the output version of the input tensor as a plurality of units of input data; and
perform at least one convolution operation on the plurality of units of the input data to generate output data.

2. The neural processor circuit of claim 1, wherein the tensor access operation circuit comprises a gather unit circuit coupled to the system memory, the gather unit circuit configured to:
compute, using the source index, an index for referencing an index tensor in the system memory, the index tensor representing indexing information into the source tensor;
address the index tensor from the system memory using the index;
generate, using components of the addressed index tensor and the source index, the indirect source index for indirect addressing of the source tensor in the system memory; and
map the one or more source components in the system memory into the input tensor having the another rank by accessing the source tensor in the system memory using the indirect source index.

3. The neural processor circuit of claim 2, wherein the gather unit circuit is further configured to permute dimensions of the source index to generate the index for referencing the index tensor.

4. The neural processor circuit of claim 3, wherein the gather unit circuit is further configured to reduce a rank of the index tensor by permuting the dimensions of the source index to generate the index with a reduced rank for referencing the index tensor.

5. The neural processor circuit of claim 2, wherein the gather unit circuit comprises an indirect source index generator circuit configured to:
permute dimensions of the source index to obtain a processed version of the source index;
permute dimensions of the index tensor;
generate an indirect index based on the permuted dimensions of the index tensor; and
compute the indirect source index by combining the indirect index and the processed version of the source index.

6. The neural processor circuit of claim 2, wherein:
each of the source index and the indirect source index comprises a five-dimensional tensor index,
the index tensor comprises a six-dimensional tensor, and
the source index is generated using a rasterizer of a tensor read control circuit in the tensor access operation circuit.

7. The neural processor circuit of claim 2, wherein the gather unit circuit comprises a source tensor access and gather circuit coupled to the system memory, the source tensor access and gather circuit configured to:
permute one or more dimensions of the source tensor in the system memory using the indirect source index to generate the input tensor.

8. The neural processor circuit of claim 7, wherein the source tensor access and gather circuit is further configured to:
filter the permuted one or more dimensions of the source tensor to generate the input tensor for storage into the data processor circuit.

9. The neural processor circuit of claim 1, wherein the tensor access operation circuit comprises a crop unit circuit coupled to the system memory, the crop unit circuit configured to:
extract the region of the source tensor in the system memory using a plurality of crop descriptors to generate the input tensor.

10. The neural processor circuit of claim 1, wherein the tensor access operation circuit comprises a crop unit circuit coupled to the system memory, the crop unit circuit configured to:
compute, using the source index, an index referencing an index tensor in the system memory, the index tensor representing indexing information into the source tensor;
fetch, using the index, a plurality of crop descriptors from the index tensor in the system memory;

generate, using the plurality of crop descriptors and the source index, a plurality of crop parameters of the indirect source index for accessing the region of the source tensor in the system memory; and extract the region of the source tensor in the system memory using the indirect source index to generate the input tensor.

11. The neural processor circuit of claim 1, wherein the tensor access operation circuit comprises a crop unit circuit coupled to the system memory, the crop unit circuit configured, in a static crop mode, to:

obtain a plurality of crop parameters directly from the source index based on information from a task descriptor; and extract the region of the source tensor in the system memory using the plurality of crop parameters to generate the input tensor.

12. The neural processor circuit of claim 1, further comprising a planar engine circuit coupled to the at least one neural engine circuit and the data processor circuit, the planar engine circuit configured to:

perform a planar operation on at least a portion of the output data received from the data processor circuit to generate a version of the output data; and write back the version of the output data into the data processor circuit.

13. A method of operating a neural processor circuit, comprising:

selecting, based on a mode signal, an operation mode to access a system memory in one of two mutually exclusive modes;

indirectly accessing, in response to the selected operation mode including a first mode of the two mutually exclusive modes, by a tensor access operation circuit of the neural processor circuit, based on a first index for referencing a first index tensor in the system memory generated by a first circuit using a source index provided to the first circuit in the first mode, at least a region of a source tensor in the system memory external to the neural processor circuit and coupled to the tensor access operation circuit;

indirectly accessing, in response to the selected operation mode including a second mode of the two mutually exclusive modes, at least the region of the source tensor in the system memory based on crop descriptors generated by a second circuit and used for computation of an indirect source index, wherein the crop descriptors are generated by the second circuit receiving as input a second index for referencing a second index tensor, the second index is generated by a third circuit using the source index provided to the third circuit in the second mode, the source tensor comprising one or more source components having a rank;

mapping, by the tensor access operation circuit, the one or more source components into an input tensor having another rank;

storing an output version of the input tensor into a data processor circuit of the neural processor circuit coupled to the tensor access operation circuit;

receiving, from the data processor circuit by at least one neural engine circuit of the neural processor circuit, the output version of the input tensor as a plurality of units of input data; and operating the at least one neural engine circuit by performing at least one convolution operation on the plurality of units of the input data to generate output data.

14. The method of claim 13, further comprising:

computing, by a gather unit circuit of the tensor access operation circuit using the source index, an index for referencing an index tensor in the system memory, the index tensor representing indexing information into the source tensor;

addressing, by the gather unit circuit, the index tensor from the system memory using the index;

generating, by the gather unit circuit using components of the addressed index tensor and the source index, the indirect source index for indirect addressing of the source tensor in the system memory; and mapping, by the gather unit circuit, the one or more source components in the system memory into the input tensor having the another rank by accessing the source tensor in the system memory using the indirect source index.

15. The method of claim 14, further comprising:

permuting, by an indirect source index generator circuit of the gather unit circuit, dimensions of the index tensor;

generating, by the indirect source index generator circuit and based on the permuted dimensions of the index tensor, an indirect index;

permuting, by the indirect source index generator circuit, dimensions of the source index to obtain a processed version of the source index; and computing, by the indirect source index generator circuit, the indirect source index by combining the indirect index and the processed version of the source index.

16. The method of claim 13, further comprising:

computing, by a crop unit circuit of the tensor access operation circuit using the source index, an index referencing an index tensor in the system memory, the index tensor representing indexing information into the source tensor;

fetching, by the crop unit circuit using the index, a plurality of crop descriptors from the index tensor in the system memory;

generating, by the crop unit circuit using the plurality of crop descriptors and the source index, a plurality of crop parameters of the indirect source index for accessing the region of the source tensor in the system memory; and extracting, by the crop unit circuit, the region of the source tensor in the system memory using the indirect source index to generate the input tensor.

17. The method of claim 13, further comprising:

obtaining, by a crop unit circuit of the tensor access operation circuit, a plurality of crop parameters directly from the source index based on information from a task descriptor; and extracting, by the crop unit circuit, the region of the source tensor in the system memory using the plurality of crop parameters to generate the input tensor.

18. An electronic device, comprising:

a system memory; and a neural processor circuit including at least one neural engine circuit, a data processor circuit and a tensor access operation circuit, the tensor access operation circuit coupled to the data processor circuit and the system memory, the tensor access operation circuit configured to:

select, based on a mode signal, an operation mode to access the system memory in one of two mutually exclusive modes;

indirectly, in response to the selected operation mode including a first mode of the two mutually exclusive modes, access at least a region of a source tensor in the system memory based on a first index for referencing a first index tensor in the system memory generated by a first circuit using a source index provided to the first circuit in the first mode;

indirectly access, in response to the selected operation mode including a second mode of the two mutually exclusive modes, at least the region of the source tensor in the system memory based on crop descriptors generated by a second circuit and used for computation of an indirect source index, wherein the crop descriptors are generated by the second circuit receiving as input a second index for referencing a second index tensor, the second index is generated by a third circuit using the source index provided to the third circuit in the second mode, the source tensor comprising one or more source components having a rank, and map the one or more source components into an input tensor having another rank, the data processor circuit coupled to the tensor access operation circuit, the data processor circuit configured to store an output version of the input tensor, and the at least one neural engine circuit coupled to the data processor circuit, the at least one neural engine circuit configured to:

receive, from the data processor circuit, the output version of the input tensor as a plurality of units of input data; and perform at least one convolution operation on the plurality of units of the input data to generate output data.

19. The electronic device of claim 18, wherein the tensor access operation circuit comprises a gather unit circuit coupled to the system memory, the gather unit circuit configured to:

compute, using the source index, an index for referencing an index tensor in the system memory, the index tensor representing indexing information into the source tensor;

address the index tensor from the system memory using the index;

generate, using components of the addressed index tensor and the source index, the indirect source index for indirect addressing of the source tensor in the system memory; and map the one or more source components in the system memory into the input tensor having the another rank by accessing the source tensor in the system memory using the indirect source index.

20. The electronic device of claim 18, wherein the tensor access operation circuit comprises a crop unit circuit coupled to the system memory, the crop unit circuit configured to:

compute, using the source index, an index referencing an index tensor in the system memory, the index tensor representing indexing information into the source tensor;

fetch, using the index, a plurality of crop descriptors from the index tensor in the system memory;

generate, using the plurality of crop descriptors and the source index, a plurality of crop parameters of the indirect source index for accessing the region of the source tensor in the system memory; and extract the region of the source tensor in the system memory using the indirect source index to generate the input tensor.

* * * * *

UNITED STATES PATENT AND TRADEMARK OFFICE
CERTIFICATE OF CORRECTION

| | | |
|---|---|---|
| PATENT NO. | : 12,277,494 B2 | Page 1 of 1 |
| APPLICATION NO. | : 16/953033 | |
| DATED | : April 15, 2025 | |
| INVENTOR(S) | : Mills | |

It is certified that error appears in the above-identified patent and that said Letters Patent is hereby corrected as shown below:

On the Title Page

Column 2, Item (57), under "ABSTRACT", Line 11, delete "multiple of" and insert -- multiple --, therefor.

Column 2, Item (57), under "ABSTRACT", Lines 13-14, delete "convolution operations" and insert -- one convolution operation --, therefor.

Signed and Sealed this
Twentieth Day of May, 2025

Coke Morgan Stewart
*Acting Director of the United States Patent and Trademark Office*